United States Patent [19]

Trahan et al.

[11] Patent Number: 5,045,219

[45] Date of Patent: * Sep. 3, 1991

[54] USE OF POLYALPHALOLEFIN IN DOWNHOLE DRILLING

[75] Inventors: David O. Trahan, Abbeville; Michael B. Faulk, Kaplan, both of La.

[73] Assignee: Coastal Mud, Incorporated, Abbeville, La.

[ * ] Notice: The portion of the term of this patent subsequent to Oct. 24, 2006 has been disclaimed.

[21] Appl. No.: 275,201

[22] Filed: Nov. 22, 1988

Related U.S. Application Data

[63] Continuation-in-part of Ser. No. 145,149, Jan. 19, 1988, Pat. No. 4,876,017.

[51] Int. Cl.$^5$ .................................................. C09K 7/02
[52] U.S. Cl. .................. 252/8.51; 252/8.551; 252/8.511; 166/301
[58] Field of Search ............ 585/12, 18; 166/301; 252/8.551, 8.554, 8.511, 8.514, 8.51, 8.515

[56] References Cited

U.S. PATENT DOCUMENTS

| | | | |
|---|---|---|---|
| 2,500,163 | 3/1950 | Garwood | 585/18 |
| 2,969,321 | 1/1961 | Carpenter | 252/8.5 |
| 3,108,068 | 10/1963 | Weiss et al. | 252/8.515 |
| 3,140,747 | 7/1964 | Mitacek | 175/66 |
| 3,298,954 | 1/1967 | Brown | 585/3 |
| 3,351,079 | 11/1967 | Gibson | 137/13 |
| 3,396,105 | 8/1968 | Burdyn et al. | 252/8.515 X |
| 4,263,465 | 4/1981 | Sheng et al. | 585/18 |
| 4,282,392 | 8/1981 | Cupples et al. | 585/18 X |
| 4,436,636 | 3/1984 | Carnicom | 252/8.551 X |
| 4,464,269 | 8/1984 | Walker et al. | 252/8.551 |
| 4,502,963 | 3/1985 | Harmon | 252/8.511 |
| 4,525,285 | 6/1985 | Son et al. | 252/8.515 |
| 4,587,368 | 5/1986 | Pratt | 585/525 X |
| 4,652,385 | 3/1987 | Cohen | 252/49.8 X |
| 4,876,017 | 10/1989 | Trahan et al. | 252/8.51 |

FOREIGN PATENT DOCUMENTS 2131067 6/1984 European Pat. Off. .

Primary Examiner—Robert L. Stoll
Assistant Examiner—Gary L. Geist
Attorney, Agent, or Firm—Pravel, Gambrell, Hewitt, Kimball & Krieger

[57] ABSTRACT

The composition of matter and application thereof in the present invention relates to the application of a synthetic hydrocarbon compound, a polyalphaolefin liquid, blended in various concentrations with chemical oil and water emulsifiers, thinners and oil and water surface tension reducers, the concentration of polyalphaolefin liquid to that of the remaining portion of the blend being no less than 5%; blending the polyalphaolefin liquid and the emulsifiers in a blending tank containing water base drilling mud; circulating the blend of polyalphaolefin liquid and emulsifier with the water base drilling mud down hole, so that the blend of polyalphaolefin liquid emulsifier and water base drilling mud lubricates the drill string or reduces the differential pressure between the wall of the borehole and the drill string so that the drill string is free to rotate and drilling may be undertaken with less drag or torque. In another application, the polyalphaolefin blended with the emulsifier serves as a spotting fluid in order to unstick drill pipe that has become stuck.

11 Claims, No Drawings

USE OF POLYALPHALOLEFIN IN DOWNHOLE DRILLING

This is a continuation-in-part application of U.S. Ser. No. 145,149, entitled "The Use of Polyalphaolefin In Downhole Drilling", filed on Jan. 19, 1988, by the same inventors, now U.S. Pat. No. 4,876,017.

BACKGROUND OF THE INVENTION

1. Field of the Invention

The present invention relates to downhole lubricants and spotting fluids. More particularly, the present invention relates to the use of a downhole drilling compound used as an additive in water-based drilling fluids to lubricate the drill pipe during the drilling process and to free the drill pipe that has become stuck during the drilling process. The present invention further relates to the use of a synthetic hydrocarbon fluid, in particular polyalphaolefin (PAO) liquid containing no more than 0.5% 1-decene monomer, blended in a concentration range of at least 5% by volume with emulsifiers; sometimes referred to as the PAO/emulsifier blend. When introduced at a certain volume downhole, the compound performs as a lubricating agent, used particularly for preventing the drag and torque on drill pipe, and as a spotting fluid, for dislodging stuck drill pipe from the well bore. One distinct advantage of the invention over the previous art in this field, is that the PAO/emulsifier blend is non-toxic to marine life and does not produce a visible sheen when discharged into water bodies.

2. General Background

In the drilling of oil and/or gas wells, a drill bit at the end of a rotating drill string or at the end of a drill motor is used to penetrate through geologic formations. During this operation a drilling mud is circulated through the drill string, out of the bit and is returned to the surface via the annular space between the drill pipe and the formation. The drilling mud, a fluid, cools and lubricates the drill string and drill bit and is designed to counterbalance, through hydrostatic pressure, the encountered formation pressures while providing a washing action to remove the formation cuttings from the wellbore. The drilling mud also forms a friction reducing wall cake between the drill string and the wellbore.

During the drilling of the well, the drill string may demonstrate a tendency to develop unacceptable rotational torque or in the worse case become stuck. At this point, the drill string cannot be raised, lowered and/or rotated. The common factors that can lead to this situation are (1) cuttings or slough buildup in the borehole; (2) an undergauge borehole; (3) irregular borehole development embedding a section of the drill pipe into the drilling mud wall cake; and (4) differential formation pressure unexpectedly encountered.

In the case of differential sticking, the hydrostatic fluid pressure of the drilling mud is greater than the permeable pressure of the exposed formation causing the flow of drilling mud into that area of the formation thus lodging the drill pipe against the formation face. When this occurs, the contact area of the drill pipe and the formation is great enough to cause an increase in rotational torque such that it prevents further movement of the drill pipe without a risk of parting the drill pipe string.

Previous publications concerning methods of preventing drill pipe from sticking and/or freeing stuck drill pipe have discussed the common method of using an oil mud or oil or water based surfactant composition, to reduce friction, permeate drilling mud wall cake, destroy binding wall cake and reduce differential pressure.

There remains a serious need for chemical compositions which can better reduce frictional torque and release stuck drill pipe while demonstrating a low order of toxicity to marine life, more specifically a product to comply with NPDES permit GOM $LC^{50}$ test, and not produce a surface sheen on the water body. In contrast to prior art developments which incorporated the use of refined crude oil, diesel, kerosene, mineral oil and most recently low polynuclear aromatic mineral oils (as described in International Pat No. WO 83,102,949), it has been discovered that synthetic oils, and iso-paraffinic oil with no aromatic content, in particular a class of synthetic oils known as polyalphaolefin, demonstrate the required fluid properties and provide the necessary low order of toxicity to comply with the NPDES permit GOM $LC^{50}$ to function as the primary composition of downhole fluid additives, more specifically a lubricant and spotting fluid.

Previous developments in this area deal with the application in oil based mud. This invention specifically pertains to the application of these polyalphaolefin compounds as an additive in water based drilling fluids. In contrast to the previous use of synthetic oils in lubricating engines, mills, etc., this invention does not deal with metal to metal, thin film type of lubrication. It is specifically the use of a polyalphaolefin liquid blended with emulsifiers used in a concentration of at least 0.25% by volume introduced as an additive into a water based drilling fluid to lubricate the drill pipe while rotating or pulling past a mud filter cake, hard or soft rock, or casing in a well bore, and to unstick drill pipe that has become differentially stuck.

SUMMARY OF THE PRESENT INVENTION

The composition of matter and application thereof in the present invention relates to the application of a synthetic hydrocarbon compound, a polyalphaolefin liquid, blended in various concentrations with chemical oil and water emulsifiers, thinners and oil and water surface tension reducers, the concentration of polyalphaolefin liquid to that of the remaining portion of the blend being no less than 5%; blending the polyalphaolefin liquid and the emulsifiers in a blending tank containing water base drilling mud in an amount of at least 0.25% by volume; circulating the blend of polyalphaolefin liquid and emulsifier with the water base drilling mud down hole, so that the blend of polyalphaolefin liquid emulsifier and water base drilling mud lubricates the drill string or reduces the rotational torque or drag between the wall of the borehole and the drill string so that the drill string is free to rotate and drilling may be undertaken with less drag or torque. In another application, the polyalphaolefin blended with the emulsifier serves as a spotting fluid in order to unstick drill pipe that has been stuck. In this method, the polyalphaolefin is blended with the emulsifiers in a concentration of at least 5% polyalphaolefin; the polyalphaolefin emulsifier blend is introduced into the borehole as a "pill"; the pill is circulated downhole in the mud system through the annulus to the depth at which the pipe is stuck; the polyalphaolefin emulsifier blend acts on the wall filter cake reducing the differential pressure bond. For purposes of this invention, the emulsifier, thinner and surface tension reducing additive can, in the case of the spotting fluid, be a blend of modified fatty acid and Amides. In the case of the drilling fluid lubricant, the additive can be described as a blend of sulfurized fatty acids and modified fatty acids. For purposes of this invention, the polyalphaolefin is a totally hydrogenated alpha-olefin oligomer produced from an alpha-olefin such as 1-decene. More particularly, the polyalphaolefin relates to an alpha-olefin oligomer comprised of dimer, trimer, tetramer and pentamer having a viscosity of approximately 2 centistokes at 210 degrees Fahrenheit.

Therefore, it is a principal object of the present invention to provide a synthetic hydrocarbon, more particularly, polyalphaolefin, utilized as a lubricant to be administered in downhole drilling operations for reducing the drag or torque on the drill string during drilling;

It is a further object of the present invention to provide the application of a polyalphaolefin as a spotting fluid in order to unstick pipe that has been stuck downhole;

It is a further object of the present invention to provide the application of a polyalphaolefin-emulsifier blend as a downhole lubricant which is non-toxic to marine life and does not produce a sheen on the water surface when dumped on the water body;

It is still a further object of the present invention to provide a non-toxic base fluid that complies with NPDES-GOM-LC$^{50}$ test, the polyalphaolefin liquid consisting of a low value (less than 0.5% concentration of 1-decene monomer).

DETAILED DESCRIPTION OF THE PREFERRED EMBODIMENT

The preferred embodiment of the combination of matter and the system of application of same of the present invention would utilize a synthetic hydrocarbon fluid, in particular polyalphaolefin (PAO) liquid which would preferably contain no more than 0.5% 1-decene monomer, in a concentration range of at least 5% by volume with other liquid additives blended in various concentrations; additives such as chemical oil and water emulsifiers, thinners, and oil and water surface tension reducers. The concentration of the polyalphaolefin liquid to that of the remaining portion of the blend would be no less than 5% and function as a water base drilling mud lubricant or a water base drilling mud spotting fluid. When utilized as a water base drilling lubricant, the blend of polyalphaolefin liquid and additives, presently sold under the registered trademark "COASTALUBE", would have an optimum PAO liquid concentration of 70% to 95% and an optimum additive concentration of 30% to 5%. When utilized as a water base spotting fluid, the blend is sold under the registered trademark COASTAL SPOT; likewise, the polyalphaolefin liquid comprising an optimum percentage of 70% to 95% of the blend, and the optimum additive concentration comprising 30% to 5% of the blend.

For purposes of this invention, in either case when the PAO liquid-additive blend is either serving as a drilling fluid lubricant, or as a spotting fluid, the emulsifier, thinner, surface tension reducing additives can be described as a blend of modified fatty acid and amides. The polyalphaolefin liquid is commercially prepared in a number of different methods, but for purposes of this invention the totally hydrogenated alpha-olefin oligomer is produced from an alpha-olefin such as 1-decene. More particularly, the PAO liquid is an alpha-olefin oligomer comprised of dimer, trimer, tetramer, and pentamer having a viscosity of approximately 2 centistokes at 210 degrees Fahrenheit. Furthermore, in order to qualify as a non-toxic base fluid and comply with NPDES GOM LC$^{50}$ test, the polyalphaolefin liquid must consist of a low value (less than 0.5% concentration) of 1-decene monomer. The various oligomer distributions were determined by gas chromotography. The important feature of the polyalphaolefin liquid application downhole and more particularly offshore, is the fact that it is non-toxic to marine life and does not produce a sheen on the water when the liquid is introduced into the sea water.

Turning now to the manner in which the PAO blend is applied downhole, reference is made to the fact that in a water base drilling system, as was discussed earlier, the drill string may at one point demonstrate rotation through the formation under increased torque or drag, and lubrication of the drill string is critical. Therefore, one would introduce a lubricant into the water base mud system, in order to lubricate the drill string. This lubricant would comprise a polyalphaolefin liquid containing no more than 0.5% 1-decene monomer, at an optimum concentration range of between 70% and 95% polyalphaolefin liquid to an optimum range of 30% to 5% additives, more particularly chemical, oil, and water emulsifiers, however, the percentage of of polyalphaolefin liquid would be no less than 5% of the blend. This polyalphaolefin-additive blend would then be added to the water base mud system, for example by introduction of the polyalphaolefin-additive blend into the mud pit, so that the blend would be in a concentration of at least 0.25% to 6.0% by volume in the water base drilling mud system. The drilling mud, in the system, during the introduction of the PAO-additive blend, does not have to be interrupted, and the blend would then be mixed into the water base mud system and introduced downhole. Upon being introduced downhole, the PAO-additive blend would help to lubricate the surface between the wall of the drill pipe and the wall of the surrounding formation, so as to reduce the torque and drag on the drill string during downhole drilling.

Due to the fact that the polyalphaolefin has a concentration of no more than 0.5% 1-decene monomer, the polyalphaolefin liquid is non-toxic to marine life, and therefore, can be maintained in the mud system during drilling, and the drill cuttings do not have to be recovered and may be discharged. In the previous state of the art, if an oil based lubricant was introduced into the mud system, the entire mud system would have toxic levels above acceptable limits as per the LC$^{50}$ test and/or would produce a sheen on the water. In order to avoid the possibility of the spreading of the lubricant into the surrounding seawater, creating a hazard to marine life, the drilling fluid and cuttings would necessitate containment. The combination of matter in the present invention would overcome this likelihood and could be maintained in the water base mud system allowing normal discharge of drilling fluids and/or cuttings.

In its second application, the polyalphaolefin liquid/additive blend, would be utilized in the same concentration, with the same additives such as emulsifiers, downhole in order to unstick the drill string that has become stuck to the wall of the formation due to various factors including differential pressure downhole. In this particular application of the invention, the normal circulation of the water base mud system would be altered to allow for a certain volume of the polyalphaolefin liquid/additive blend to be introduced as a "pill" into the active mud system, which would therefore result in a greater combination of the polyalphaolefin liquid/additive blend being applied at a predetermined point downhole. Following the introduction of the blend into the the borehole, the blend would then be displaced into the annulus in the borehole at the estimated level that the drill string has become stuck, and the blend would serve as a spotting fluid in order to, for example, replace the water in the mud wall cake causing the sticking of the pipe against the wall mud cake due to differential pressure, and would relieve that pressure and rotational torque in order to allow the drill string to resume rotational and vertical movement. Again, in view of the fact that the polyalphaolefin liquid/additive blend is non-toxic to marine life, the pill could be maintained downhole and recirculated in the system, which thereafter it would function as a lubricant, and not have to be isolated and removed from the active mud system. At the present time, if an oil-base spotting fluid is introduced downhole as a pill, the EPA may require that 50 barrels of mud preceeding and following the pill be retrieved together with the pill in order to avoid contamination of the mud system by a toxic substance such as the state-of-art oil base spotting fluids.

For purposes of clarification of the present invention, applicant is submitting herewith the following exhibits attached to this application and incorporated herein by reference, which provide evidence of the usefulness and non-toxicity of the present invention.

EXHIBIT A

Exhibit A attached hereto is a mixing chart of the polyalphaolefin liquid/additive blend being used as a spotting fluid, and the manner in which the composition would operate under various required densities.

EXHIBIT B

Exhibit B is a summary of the result of tests conducted for providing bio-assay data from Coastal Chemical Company on the drilling fluid containing 3% volume polyalphaolefin.

EXHIBIT C

Exhibit C is a test and the results of the tests for approximating $LC^{50}$ of a base mud containing 10% of spotting fluid in the sample.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A drilling fluid compound for lubricating drill pipe in a water base mud system during the drilling process, the compound comprising:
   a) a polyalphaolefin liquid at a concentration of at least 5% of the drilling fluid compound;
   b) an emulsifier additive added to the polyalphaolefin liquid, in a range of 30% to 5% concentration; and
   c) the drilling fluid compound introduced into the water base mud system in a liquid volume concentration of 0.25% to 6.0% of the water base drilling mud for serving as a lubricant in the water base drilling mud system.

2. The drilling fluid compound in claim 1, wherein the polyalphaolefin would contain no more than 0.5% 1-decene monomer.

3. The drilling fluid compound in claim 1, wherein the percentage of polyalphaolefin in the drilling fluid compound would be 90%.

4. The drilling fluid compound in claim 1, wherein the percentage of emulsifier additives in the drilling fluid compound would be 10%.

5. The drilling fluid compound in claim 1, wherein the drilling fluid compound is non-toxic to marine life and may be a permanent addition to the water base mud system.

6. In a process for drilling oil wells, wherein the drill string is rotated in a formation utilizing a water base mud system, the process comprising the following steps:
   a) combining a liquid polyalphaolefin in a concentration of at least 5% by volume of the polyalphaolefin to an emulsifier;
   b) introducing a volume of the polyalphaolefin-emulsifier combination into the volume of water base mud at a concentration of 0.25% to 6.0% percent of polyalphaolefin-emulsifier;
   c) circulating the mud containing the polyalphaolefin-emulsifier combination down the borehole sufficient to lubricate the pipe to reduce the friction between the wall of the drill pipe and the formation as the drill pipe is rotated.

7. The process in claim 6, wherein the polyalphaolefin-emulsifier contains 90% polyalphaolefin and 10% emulsifier.

8. The process in claim 6, wherein the polyalphaolefin-emulsifier combination is non-toxic to marine life in its application downhole.

9. A process for unsticking drill pipe in a water base mud system, where the drill pipe has become differentially stuck against the formation, the process comprising the following steps:
   a) locating the point downhole where the drill pipe has become stuck against the formation;
   b) blending a polyalphaolefin in a concentration of at least 5% by volume with an emulsifier; and
   c) introducing a certain volume of the polyalphaolefin-emulsifier downhole as a spotting fluid to the depth of the point of the stuck pipe and in a quantity sufficient to displace the water-based mud over the entire stuck interval to unstick the pipe.

10. The process in claim 9, wherein the polyalphaolefin-emulsifier blend is introduced into the mud system as a "pill" separated from the mud in the system.

11. The process in claim 9, wherein the polyalphaolefin emulsifier blend displaces the water in the formation at the point the pipe is stuck against the formation and lubricates the pipe and wellbore so that rotation and vertical movement of the drill pipe can be reestablished.

* * * * *